United States Patent [19]

Piampiano

[11] Patent Number: 4,470,674

[45] Date of Patent: Sep. 11, 1984

[54] ADJUSTABLE SPECTACLE FRAME

[76] Inventor: Carl Piampiano, 2601 Wadsworth Rd., Zion, Ill. 60099

[21] Appl. No.: 302,696

[22] Filed: Sep. 15, 1981

[51] Int. Cl.$^3$ .............................................. G02C 5/12
[52] U.S. Cl. .................................... 351/136; 351/128; 351/137
[58] Field of Search ............... 351/126, 131, 132, 136, 351/137, 138

[56] References Cited

U.S. PATENT DOCUMENTS

| | | | |
|---|---|---|---|
| 1,946,233 | 2/1934 | Page | 351/136 |
| 3,043,191 | 5/1959 | Lanski | 351/136 |
| 3,077,173 | 11/1961 | Gongoll | |
| 3,515,467 | 6/1970 | Stewart | 351/137 |
| 4,190,334 | 2/1980 | O'Neil | 351/137 |
| 4,252,422 | 2/1981 | Speckhart | 351/128 |

Primary Examiner—John K. Corbin
Assistant Examiner—Paul M. Dzierzynski
Attorney, Agent, or Firm—Balogh, Osann, Kramer, Dvorak, Genova & Traub

[57] ABSTRACT

The invention relates to an improved spectacle frame, provided with self-adjusting resilient means suspended in a chordal horizontal manner in the nose bridge area and attached respectively to the opposing inner ends of the frame.

The resilient means which are formed of a flexible elastic material are adapted to conform in shape to the arcuate shape of the nose of the user, under the weight thrust of the spectacle frame. In conforming to the shape of the nose, the resilient means are capable of continuously supporting the frame on the nose in a proper mounting position and in proper lens alignment.

Anchoring means are also provided for varying the points of attachment of the resilient means to the inner ends of the frame, so as to vary the tension as well as the height with respect to a horizontal plane of the resilient means.

9 Claims, 9 Drawing Figures

ADJUSTABLE SPECTACLE FRAME

FIELD OF THE INVENTION

The present invention relates in general to spectacle frames, and in particular to a device for supporting such frames in proper mounting position on the nose of the user, without causing discomfort or annoyance of slippage to the user.

BACKGROUND OF THE INVENTION

It is well recognized in the optical art, that even with the most expensive conventional spectacle frames, the initial fitting by the optician can seldom deliver a nose piece that will universally fit all noses, or have a fit that will make contact with more than 20-30% of the nose surface.

In most cases, this is a result of the particular shaping of the conventional nose piece, which is adapted to rest on the opposing sides of the nose rather than on the bridge area of the nose.

The sides of the nose are considered the most sensitive and painful nose contact points, while the nose bridge is deemed the least sensitive to pain contact point. Because of its strategic location, the nose bridge may also aid in the equal distribution of the weight of the spectacle frame over the entire surface of the nose.

Known spectacle frames, whether or not using conventional nose pieces, tend to slide down the sides of the nose in response to certain head movements or any radical change in facial expression. This sliding down recurrs frequently and requires constant readjustment by the user, for example, to push the frame upwardly back into the correct mounting position on the nose.

This is not only a source of agony and pain to the spectacle frame user, but also defeats the main purpose underlying proper optical fitting of eyeglasses, which is to prevent lens misalignment and retain or continuously support the frame in a proper and stable mounting position on the nose of the user.

There have been many attempts in the prior art to resolve the difficulties encountered in the use of conventional spectacle frames and nose pieces.

For example, various modifications in temple bars and attachments thereto have been devised and developed in an attempt to retain the frames in a stationary position and in proper height on the forehead or nose of the user. In addition, several types of nose pads were developed for comfortable wear and better retaining of the frames on the forehead of the user.

However, the improved temple bars, as well as the nose pads, were only partially effective in retaining the frames in a proper fixed position on the nose of the user.

Since the pads have a fixed thickness and are secured by adhesive to the bridge portion of the frame, they are not capable of accurately adjusting the height or elevation of the frame on the nose, and as a result, they cannot provide for proper lens alignment.

The nose pads also tend to concentrate the weight of the frame at two pressure points at the lower end of the opposed sides of the nose. This means that each pressure point at the side of the nose, which point constitutes ten percent (10%) or less of the nose surface, is carrying 50% or more (if the frames are slightly bent) of the frame's weight. This causes, accordingly, pain and great discomfort to the user, in addition to the failure to maintain the frame in the proper mounting position.

All other devices and methods developed in the prior art for resolving the problems and eliminating the difficulties encountered in the use of conventional spectacle frames and nose pieces have failed in a similar manner to provide the proper means for continuously supporting the frame in a proper fixed mounting position on the nose of the user.

It is in view of this long-felt need in the art that the inventor has investigated and discovered the source of the problems in the art and has developed the present invention, which substantially eliminates the difficulties as set forth above.

SUMMARY OF THE INVENTION

The present invention contemplates the provision of an improved eyeglass or spectacle frame which, after proper determination of style and size, and following the lens fitting, may be positioned on the forehead of the user with little or no initial or further adjustment. Furthermore, the frame may be supported continuously on the nose of the user, in a proper elevation and mounting position, so as to ensure proper lens alignment at all times.

In accordance with the invention, the spectacle frame is provided with self-adjusting resilient means that are suspended in a chordal horizontal fashion across the juncture region, and in the void area of the nose piece.

The resilient means, which are attached respectively to the opposing sides of the juncture region, are adapted to conform to the arched shape of the nose, preferably at the bridge area of the nose, under the weight thrust of the spectacle frame. In conforming to the shape of the nose, the resilient means may form a slight groove (or grooves) in the surface of the nose at the precise area embraced by the same. This groove (or grooves) may aid the resilient means in the continuous biasing upwardly and supporting of the spectacle frame in the proper mounting position on the nose.

The self-adjusting nature of the resilient means aids in substantially eliminating many of the problems in the prior art. For example, most head movements or changes in facial expression (radical or not) will not cause the slipping or sliding down of the spectacle frame on the nose, because the resilient means are capable of self-adjustment that will prevent any change in mounting position of the spectacle frame.

Also, in conventional spectacle frames, the weight of the frame was concentrated on 20-30% only of the nose surface. However, in the present invention, due to increased contact area between the nose bridge area and the resilient means, the weight of the frame is equally redistributed over substantially most of the nose's surface, or almost 100% of it.

Although the preferred embodiment of the invention is directed primarily at a bridge-type spectacle frame having a detachable comfort-type nose piece, the invention may be embodied in all kinds of frames with and without a nose piece, and whether the nose piece is detachable or integrally formed with the frame.

The resilient means of the invention may include an elastic or flexible cord employed in the embodiments of FIGS. 1 and 7, or an expandable elastic sleeve in the embodiment of FIG. 5.

The invention includes also anchoring means for varying the points of attachment of the resilient means to the nose piece, or inner ends of the frame. In varying the points of attachment, the anchoring means may be used in varying the tension or tautness in the resilient means, as well as the height with respect to a horizontal plane, or elevation of the spectacle frames on the nose.

The anchoring means may include any conventional means, and preferably a series of closely spaced anchor points or bores on each side of the juncture region of the nose piece or inner ends of the frame. An extra series of closely spaced bores, which may include fully enclosed bores or open-ended bores, may be added to each side of the juncture region or inner ends of the frame, so as to effect easier and faster anchoring of the resilient means in the nose piece or frame.

By varying the height or elevation of the anchoring bores, as well as the particular anchoring arrangement (for example, threading patterns for ends of flexible cord of FIG. 1) of the resilient means, the degree of tension in the latter and the proper elevation of the spectacle frame on the nose may be adjusted as required.

Other objects and advantages of the invention, as well as a detailed description of various embodiments thereof, will become apparent from a study of the following description taken together with the accompanying drawings.

DETAILED DESCRIPTION OF THE INVENTION

Although the present invention has been designed primarily to improve spectacle frames of a bridge-type and using a comfort-type nose piece (or a bridge-type nose piece), it is adaptable to all types of nose pieces and frames, including the frames that do not have a cross bar (or bridge) or nose piece at the nose bridge area of the frame.

In the following detailed description, an explanation will be provided of the preferred embodiment of the invention, as well as other related embodiments. These embodiments are illustrated in FIGS. 1-9 of the drawings as relating to particular types of nose pieces or frames, but in actuality are only examples of the invention, which is adaptable as stated above, to all types of nose pieces and frames.

Figure 1:
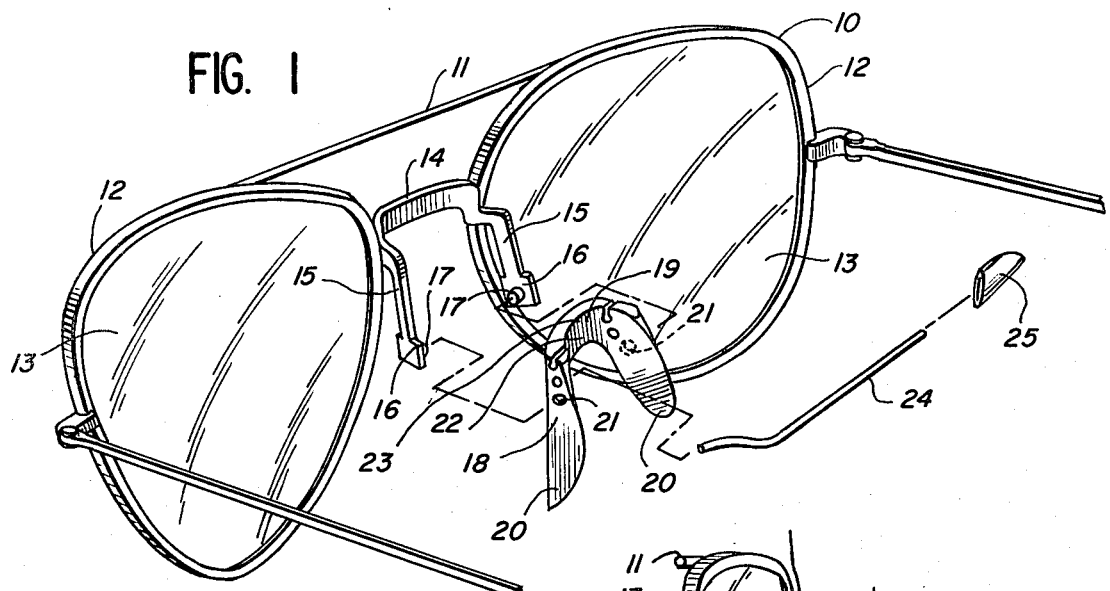
FIG. 1 is a perspective exploded view of one embodiment of the invention illustrating a nose piece provided with anchoring means, the flexible cord and its cover.

Referring to FIG. 1 of the drawings, a perspective exploded view is shown of an articulated eyeglass or spectacle frame assembly 10. The frame assembly 10 includes an upper bridge member 11 connecting the uppermost ends of window frame portions 12 provided with a pair of lenses 13, a lower bridge member 14 connecting the upper inner ends of the frame portions 12. The lower bridge member 14 is preferably provided with a pair of spaced apart downwardly projecting legs 15 ending each with wide rectangular-shaped feet 16 which are provided with prongs or male members 17, a removable nose piece 18 to be removably secured to lower bridge member 14, the nose piece 18 having a cross bar 19 connecting a pair of spaced-apart downwardly protruding legs 20 that are adapted to straddle the nose bridge of the user and rest respectively on both opposing sides of the nose.

The nose piece 18 is provided with a pair of slots 21 for receiving the prongs or male members 17 so as to secure the nose piece 18 to lower bridge member 14. Any conventional fastening means could be used to secure the nose piece 18 to the frame assembly 10.

The invention is well adaptable to use of a frame assembly 10, integrally formed with nose piece 18. It is preferable that the nose piece 18 be removable or detachably secured to the lower bridge member 14 of the frame assembly 10.

Figure 2:
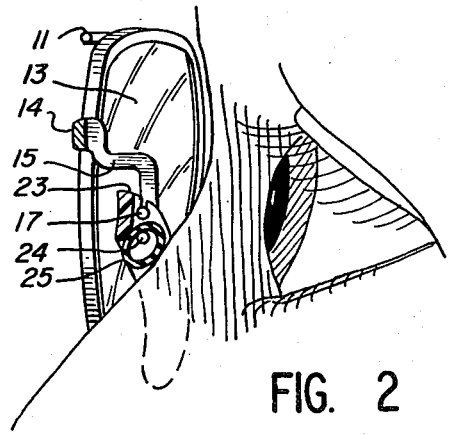
FIG. 2 is a partial sectional side elevation view of a portion of the embodiment of FIG. 1 showing part of the nose piece in section, and integrally formed with the spectacle frame.

As could be seen in FIGS. 1 and 2, the bridge-type spectacle frame (like frame assembly 10) and comfort nose piece 18, create a hidden from view void area 22 in the juncture area 23 of the nose piece 18 (or lower bridge member 14). Juncture region 23 extends longitudinally across the cross bar 19 of nose piece 18 (or when no nose piece is used, across the lower bridge member 14) and its interconnections with legs 20. The void area 22 is that upper inner non-visible portion of the nose piece which, at the juncture region 23 extends to the rear of cross bar 19. The void area is not visible when the spectacle frame is worn by anyone facing the wearer because it is hidden from view by the cross bar 19. This void area 22 has especially been designed as an area to be filled by the upper portion of the wearer's nose.

An elongated cord or strand member 24, which is preferably made of an elastic or resilient material is suspended in a chordal horizontal fashion across the void area 22 at the juncture region 23 of the nose piece 18. Although any known means may be used to secure the ends of the cord in the bores, it is stressed that it can be done without the conventional use of adhesives or the like.

It is preferred that the end tips of cord 24 be made hardened or stiff comparable to the ends of shoelaces. This can be done by dipping the end tips of the cord into a suitable hardening material or by other similar means. The stiff end tips of the cord facilitate the effective anchoring (through threading, lacing or snapping operations) thereof in the nose piece.

Flexible cord 24 is connected between the two distal end sides of the nose piece 18. It is attached at its opposing ends to the opposing end sides of the juncture region 23 of the nose piece.

Cord 24 is also provided with a cover or sleeve 25 at its mid-portion. The cover 25 is preferably made of a flexible or elastic tubing or the like.

It is to be noted that, in the embodiment of FIGS. 1-4, cord 24 is hidden from view (in the void area 22 of the nose piece) and cannot be observed by someone facing the wearer of the frame.

Any anchoring means could be used to selectively anchor the flexible cord 24 in the nose piece 18 at predetermined heights or elevations.

Figure 3:
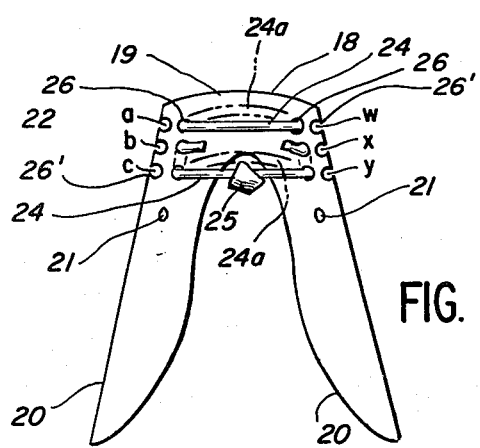
FIG. 3 is an enlarged front elevation view of the nose piece of FIG. 1, including a pair of flexible cords anchored in the nose piece.

As illustrated in FIG. 3, it is preferable that nose piece 18 be provided at each of the end sides of the juncture region 23 with a series or plurality of closely spaced anchor points 26 which may be any conventional anchoring means capable of a wide variety of threading or lacing patterns for one or more flexible cords 24 under a predetermined degree of tension.

It is preferable that the closely spaced anchor points 26 consist of a series of closely spaced generally horizontal bores. The bores employed may be straight bores or tapered bores as required for convenience of inserting the cord 24 therein, so as to facilitate the effective lacing or threading therethrough of flexible cord 24, at various lacing or threading patterns.

Although FIG. 3 illustrates a series of three bores on each side of the nose piece 18, any number (greater or lesser) of bores may be employed (limited only by the space available on the nose piece).

For the purposes of further description, the series of closely spaced bores 26 has been labelled a, b, c on one side of the juncture region 23, and w, x, y on the opposing side of the juncture region 23.

As illustrated in FIG. 3, a flexible cord 24 is attached to the nose piece 18 across the void area 22 by lacing or threading through bores 26 b–c and 26 x–y, respectively. Cord 24 has a predetermined degree of tension that is maintained by the sharp-angled bend of the stiffened end tips in bores 26 b–c and 26 x–y, respectively (The angle of the cord leaving the particular bore should be minimal to be effective). Ordinarily, threading an end of cord 24 through one bore and into another (for retaining the loose end of the cord) will suffice to hold the end portions of the cord from disengaging or pulling away, even if relatively high tension is desired on the surface of the nose. However, additional end threading (of the cord) may be resorted to if desired (See FIGS. 8 and 9).

Particular bores 26 may be selected for varying the points of attachment of cord 24 to the end sides of the nose piece, so as to vary the chordal tautness and the height with respect to a horizontal plane of the flexible cord 24.

It will be understood that, in determining or selecting the degree of tension desired in cord 24, the particular length of the cord (or chordal length) is a factor to be considered.

It will also be observed that, in selecting the number of threading bores to be formed in the nose piece 18, the number of flexible cords to be attached to the nose piece should be determined.

The use of two or more flexible cords 24 attached to the nose piece 18 across the void area 22, may be advantageous in providing backup support, and in helping to redistribute the weight of the spectacle frame over more surface of the nose. This adds to the improved and unexpected results of the invention, ensuring the proper lens alignment and retaining of the spectacle frame in proper mounting position.

Referring back to closely-spaced anchor points or bores 26, it should be noted that the latter define heights or elevation points selected for proper spectacle lens alignment and spectacle frame support. The height or elevation point of cord 24 can be adjusted by attaching the cord to the particular bores associated with a particular height.

FIG. 3 illustrates three closely-spaced bores 26, which means that a single cord 24 can be attached to the nose piece 18 at three different elevations, or if two cords 24 are employed, that each one of them may be attached at two different elevations.

The vertical spaces between the bores 26, which represent the adjustments in height of cords 24, are determined on the basis of the size and style of the particular spectacle frame involved.

It will be noted that the tension in cord 24 can be varied by either moving the ends of the cord closer to respective bores 26 or the end sides of nose piece 18 so that the tension decreases, or by allowing the ends to overlap (over the bores) and tightening or stretching the cord or changing the cord to another elevated position, so that the tension increases.

For example: In FIG. 3, the tension in cord 24 will increase if it is moved to a higher elevation so that it extends across void area 22 between bores 26b and 26y. The higher the elevation setting of cord 24, at the juncture region 23 of the nose piece 18, the lower the spectacle frame asembly 10 would be positioned on the forehead of the user, and the lower the lens alignment would be.

While the void area 22 of nose piece 18 seldom, if ever, comes in contact with the surface of the nose of the user of the spectacle frame, flexible cord or cords 24 make contact and conform in shape to the nose surface. By selecting particular bores 26 for a particular elevation or desired tension (in cord 24), or by proper adjustment of flexible cord 24 at the correct elevation and tension, the cord will make contact, and by self-adjustment conform to the shape of substantially all noses.

Figure 4:
FIG. 4 is a top plan view of the nose piece of FIG. 1 showing the flexible cord threaded through or anchored in the nose piece.

Further to be noted in FIGS. 3 and 4 is the semi-circular curve 24a shown in dotted lines and representing the flexible cord 24 which is curved under actual operating conditions. When the spectacle frame assembly 10 is worn by the user, the downward thrust of the weight of the frame assembly on the nose piece 18 causes the cord 24 to bend and wrap itself in self-adjustment, around the nose bridge of the user in a semi-circular curve that reflects the effects of the weight of the spectacle frame assembly as well as the shape, location and position of the particular nose of the user.

The flexible cord or cords 24, by partially wrapping themselves around the nose bridge, will yieldingly urge the nose piece 18 upwardly on the nose of the user and thus literally lift the spectacle frame assembly 10 into a proper mounting position on the nose, with the lenses properly aligned in front of the eyes of the user.

The nose piece 18 may be provided at the opposing end sides of juncture region 23 with two extra parallel series or pluralities of closely-spaced bores 26', one plurality being added to each end side of jucture region 23. Each additional plurality of closely-spaced bores will be formed adjacent and parallel to the earlier-formed series of closely-spaced bores, but will be located closer to the respective peripheral edge of the nose piece. For example: FIG. 3 illustrates two extra series of three closely-spaced bores 26', one series added to each opposing end side of juncture region 23. The individual added bores may be identical and be labelled the same as their horizontally corresponding parallel bores, e.g., 26' a–b–c and 26' w–x–y.

The extra added series of bores facilitate more effective and versatile lacing of the cords 24 by providing additional anchor points 26'. Flexible cord or cords 24 may be effectively anchored in nose piece 18 by means of selective threading or lacing through respective horizontal parallel and vertical parallel bores so as to be adjusted as required for the proper degree of tension and elevation.

The flexible cords 24 anchored in horizontal parallel bores, for example, 26c, 26'c and 26y, 26'y, may be shorter in length than those anchored by lacing through vertical bores, for example, 26 b-c and 26 x-y.

The added series of closely-spaced bores 26' may be formed of one or more (or substantially all) bores having a slit-type opening at the side thereof adjacent to the respective peripheral edge of the nose piece. The slitted opening may be formed from the respective edge of the nose piece 18 to the center of the bore. However, the opening of the open-ended bore at the inner side thereof may be only large enough so as to receive the end of the cord forcefully and under pressure (snapping into the bore).

This particular structure of the bores effects easier and faster anchoring of the opposing ends of the flexible cord 24 in nose piece 18, and may eliminate the need for threading. Instead of lacing or threading the ends of cord 24 in the respective bores, the anchoring of the cord is accomplished by stretching, forcing and pressing the ends of the cord through the slit of the open-ended bores (snapping operation).

For example, in FIG. 3, a second flexible cord 24 is attached to slitted or open-ended bores 26'a and 26'w by snapping the ends thereof into these bores. When the spectacle frame is worn by the user, the weight of the frame will also cause the second cord 24 to bend and wrap itself around the surface of the nose, forming a curve identical in shape to that of the nose's curve (See dotted line curve 24a in FIG. 3).

It will be noted that the stretching or snapping operation of the cord is faster and easier than threading and forms stronger anchoring. It also does not require the use of relatively long cords, which is necessary for a threading or lacing operation.

Figure 5:
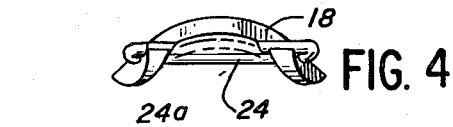
FIG. 5 is a perspective view of another embodiment of the invention showing the expandable sleeve telescopically mounted on the nose pads.

Another embodiment of the invention is illustrated in FIG. 5. In accordance with this embodiment, the frame assembly 10 does not include nose piece 18, flexible cord 24 and its cover 25. Lower bridge member 14 is provided with a pair of adjustable nose pads 27 for resting respectively on opposite sides of the nose. The pads 27 are secured to feet 16 by any conventional means.

Figure 6:
FIG. 6 is a perspective view of the expandable sleeve of FIG. 5, having a longitudinal slit.

As shown in FIGS. 5 and 6, an expandable, yieldable tubular sleeve 28 is telescopically mounted on each of nose pads 27, and portions of legs 15. Sleeve 28, which is open-ended, is formed of an expandable elastic rubber tubing or any kind of expandable elastic tubing or material. It is preferred that sleeve 28 be formed of transparent material, and have an internal diameter (i.d.) of such dimension that it will easily but snugly slide over the adjustable nose pads 28.

Sleeve 28 is adapted for use in spectacle frame assembly 10 in place of the flexible cord 24. It is provided with a longitudinal slot 29 at its mid-portion, so as to facilitate the telescoping, sliding and mounting thereof on adjustable nose pad 27. As illustrated in FIG. 5, sleeve 28 is first telescopically slid (at its slitted mid-portion) over the lower end of one adjustable pad and followed by sliding of the other end of the sleeve's slitted mid-portion over the lower end of the other adjustable pad. This results in the sleeve 28 covering both adjustable pads 27 and bending or curving upwardly in a semi-circular curve so as to form an arch that fits snugly over and saddles the nose bridge of the user. In this position, sleeve 28 has the desired degree of tension required to support spectacle frame assembly 10 in proper mounting position on the nose of the user, while at the same time distributing the weight of the frame assembly over substantially most of the nose surface.

The relatively large diameter of the tubular sleeve 28 makes possible wide contact with the exposed nose surface, while firmly supporting the frame on the nose bridge. An added advantage is that it makes wearing of the spectacle frame more comfortable to the user by softening the nose pads structure.

Figure 7:
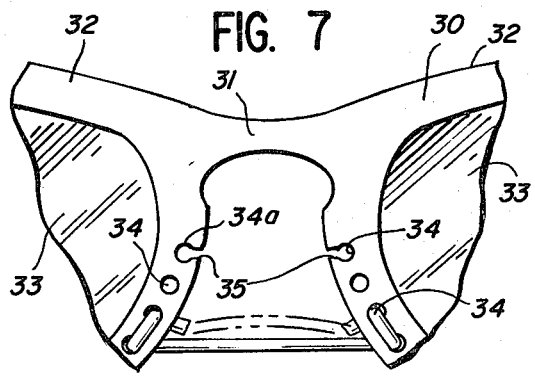
FIG. 7 is a front elevation view of another embodiment of the invention including a spectacle frame without a nose piece.

Another embodiment of the invention is illustrated in FIG. 7. In accordance with this embodiment, the spectacle frame 30 is not provided with a nose piece, nor with a lower bridge member. It has upper bridge member 31 connecting window frame portions 32, each of which is provided with a lens 33.

The inner ends of window frame portions 32 are provided each with a series of closely-spaced anchoring points 34, which may consist of any anchoring or fastening means, for attaching the opposing ends of flexible cord 24 to the frame 30.

It is preferable that the anchoring points 34 consist of a plurality of closely-spaced bores similar to the bores 26 described heretofore.

FIG. 7 illustrates a plurality of four closely-spaced bores located adjacent to the peripheral edge of each of the inner ends of frame 30 or window frame portions 32. A flexible cord 24 is suspended in a chordal horizontal fashion, across the void separating the inner ends of frame 30, and is attached by threading or lacing to respective bores on the opposing inner ends of the frame.

As described above, the bores selected for anchoring the cord 24, are selected according to the degree of frame elevation and cord tension required for proper lens alignment and support of the frame 30.

Under the weight thrust of frame 30, cord 24 will bend to wrap itself and fit snugly around the nose bridge area, assuming the curved shape of the nose in that area. This is illustrated in FIG. 7 by a dotted line curve 24a representing cord 24 under working conditions.

This embodiment of the invention has, however, the disadvantage that the anchoring bores, and suspended flexible cord 24, will be visible to any observer, in contrast with the embodiment of FIG. 1 in which the same are hidden from view.

It will be noted in FIG. 7 that the frames 30 used in this embodiment are wide enough to allow the drilling of the bores necessary to allow the threading of cords 24.

Since the present invention is aimed primarily at frames of the bridge type (FIG. 1), a double parallel series of bores is provided on each inner side of the frame. It will be understood that, in frames that do not have a nose piece (like frame 30), which have room for only one series of closely-spaced bores (on each of the inner ends of the frame), selected bores in each single series, may be provided with a slit-type opening extending from the peripheral edge of the respective inner end of the frame, to the center of the bore. These open-ended or slitted bores may facilitate the easy and fast anchoring of cord 24 in the frame by way of stretching or snapping the ends thereof into the respective bores. This may eliminate the need for threading of cord 24 into the respective bores.

Figures 8, 9:
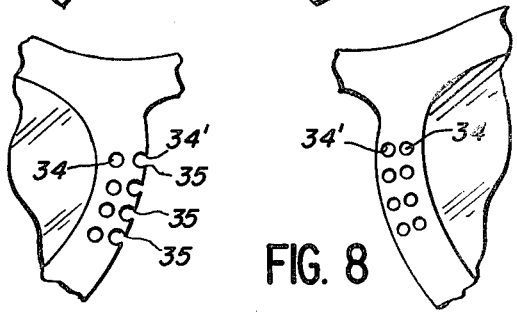
FIGS. 8 and 9 are front elevation views of a variant embodiment of FIG. 7.

In FIG. 7, bores 34a and 34w are provided with the slit-type opening 35 which extends from the peripheral edge of a respective inner end of frame 30 to the center of these bores. As illustrated in FIGS. 8 and 9, extra series of closely-spaced bores 34', may be added to each inner end of frame 30, adjacent to the series of closely-spaced bores 34, but closer to the peripheral edge of the frame 30. These extra series of closely-spaced bores provide a greater choice of anchoring points for cords 24, as well as greater versatility in the method of lacing or threading of the cords in the inner ends of frame 30.

Single bores or a whole series of the extra series of closely-spaced bores 34' may be formed with a slit-type opening extending from the peripheral edge of frame 30 to the center of these bores.

As described above, the open-ended or slitted bores 34' eliminate the need in threading cord 24 and provide an easier and faster method of anchoring cords 24 in frame 30.

FIG. 8 illustrates an extra series of closely-spaced bores 34' located on the inner end of a portion of frame 30 and provided each with a slit-type opening 35.

FIG. 9 ilustrates double series of closely-spaced bores 34 and 34', both series formed of close-ended bores.

The present invention is not to be limited to the exact arrangement or embodiments shown in the accompanying drawings or described in this specification, since various changes in the details of construction may be resorted to without departing from the spirit of the invention.

What is claimed is:

1. In an articulated spectacle frame provided with a nose piece which rests on the nose of the user, the nose piece being formed to generally fit the nose configuration of the user, including a cross bar member that rides on the bridge of the nose, and a pair of spaced apart legs connected by the bar and extending downwardly so as to straddle the nose bridge and rest respectively on both opposing sides of the nose, the improvement comprising self-adjusting resilient means suspended in a chordal horizontal fashion across the void area of the nose piece at the juncture region thereof, said void area consisting of the inner non-visible portion of the nose piece, said resilient means being attached to the nose piece respectively at both opposing sides of the juncture region, and anchoring means for selectively varying the points of attachment of said resilient means to said opposing sides of the juncture region, so as to vary the chordal tautness as well as the height with respect to a horizontal plane of said resilient means, said resilient means being adapted to bend in a semi-circular curve snugly fitting the nose under the downward thrust of the spectacle frame, so as to redistribute the weight of the spectacle frame on a substantial portion of the nose, said anchoring means comprising a first plurality of closely spaced anchoring points formed on one side of the juncture region of the nose piece, and a second plurality of closely spaced anchoring points formed on the opposing side of the juncture region of the nose piece, said first and second pluralities of closely spaced anchoring points being adapted to selective anchoring of said resilient means in the nose piece, so as to ensure proper lens alignment at the proper height on the nose.

2. In an articulated spectacle frame provided with a nose piece which rests on the nose of the user, the nose piece being formed to generally fit the nose configuration of the user, including a cross bar member that rides on the bridge of the nose, and a pair of spaced apart legs connected by the bar and extending downwardly so as to straddle the nose bridge and rest respectively on both opposing sides of the nose, the improvement comprising self-adjusting resilient means suspended in a chordal horizontal fashion across the void area of the nose piece at the juncture region thereof, said void area consisting of the inner non-visible portion of the nose piece, said resilient means being attached to the nose piece, respectively, at both opposing sides of the juncture region, and anchoring means for selectively varying the points of attachment of said resilient means to said opposing sides of the juncture region so as to vary the chordal tautness as well as the height with respect to a horizontal plane of said resilient means, said resilient means being adapted to bend in a semi-circular curve snugly fitting the nose, under the downward thrust of the spectacle frame, so as to redistribute the weight of the spectacle frame over a substantial portion of the nose, said anchoring means comprising a first plurality of closely spaced bores formed on one side of the juncture region of the nose piece, and a second plurality of closely spaced bores formed on the opposing side of the juncture region of the nose piece, said first and second pluralities of closely spaced bores being adapted to selective anchoring of said resilient means in the nose piece.

3. The improvement as set forth in claim 2, wherein said anchoring means further comprise a third plurality of closely spaced bores formed adjacent to said first plurality of closely spaced bores and on the outer end of the respective side of the juncture region of the nose piece, and a fourth plurality of closely spaced bores formed adjacent to said second plurality of closely spaced bores, and on the outer end of the respective side of the juncture region of the nose piece, said third and fourth pluralities of closely spaced bores being adaptable to effectively and selectively anchor said resilient means in the nose piece, so as to ensure proper lens alignment and supporting of the frame at the proper height on the nose.

4. In an articulated spectacle frame provided with a nose piece which rests on the nose of the user, the nose piece being formed to generally fit the nose configuration of the user, including a cross bar member that rides on the bridge of the nose, and a pair of spaced apart legs connected by the bar and extending downwardly so as to straddle the nose bridge and rest respectively on both opposing sides of the nose, the improvement comprising self-adjusting resilient means suspended in a chordal horizontal fashion across the void area of the nose piece at the juncture region thereof, said void area consisting of the inner non-visible portion of the nose piece, said resilient means being attached to the nose piece, respectively, at both opposing sides of the juncture region, and adapted to bend in a semi-circular curve snugly fitting the nose under the downward thrust of the spectacle frame, so as to redistribute the weight of the spectacle frame over a substantial portion of the nose, the improvement further comprising said resilient means comprise a flexible cord which is attached at its opposing ends to the opposing sides, respectively, of the juncture region of the nose piece, and anchoring means for selectively varying the points of attachment of said opposing ends of the flexible cord to the opposing sides respectively of the juncture region of the nose piece, so as to vary the chordal tautness as well as the height with respect to a horizontal plane of the flexible cord, said anchoring means comprising a first plurality of closely spaced anchoring points formed on one side of the juncture region of the nose piece, and a second plurality of closely spaced anchoring points formed on the opposing side of the juncture region of the nose piece, said first and second pluralities of anchoring points being adaptable to selective anchoring of said respective opposing ends of the flexible cord in the nose piece, so as to ensure proper lens alignment and supporting of the frame at the proper height on the nose.

5. In an articulated spectacle frame provided with a nose piece which rests on the nose of the user, the nose piece being formed to generally fit the nose configuration of the user, including a cross bar member that rides on the bridge of the nose, and a pair of spaced apart legs connected by the bar and extending downwardly so as to straddle the nose bridge and rest respectively on both opposing sides of the nose, the improvement comprising self-adjusting resilient means suspended in a chordal horizontal fashion across the void area of the nose piece at the juncture region thereof, said void area consisting of the inner non-visible portion of the nose piece, said resilient means being attached to the nose piece, respectively, at both opposing sides of the juncture region, and adapted to bend in a semi-circular curve snugly fitting the nose under the downward thrust of the spectacle frame, so as to redistribute the weight of the spectacle frame over a substantial portion of the nose, the improvement further comprising said resilient means comprise a flexible cord which is attached at its opposing ends to the opposing sides, respectively, of the juncture region of the nose piece, and anchoring means for selectively varying the points of attachment of said opposing ends of the flexible cord to the opposing sides respectively of the juncture region of the nose piece, so as to vary the chordal tautness as well as the height with respect to a horizontal plane of the flexible cord, said anchoring means comprising a first plurality of closely spaced bores formed on one side of the juncture region of the nose piece, and a second plurality of closely spaced bores formed on the opposing side of the juncture region of the nose piece, said first and second pluralities of closely spaced bores being adaptable to selective anchoring of said respective opposing ends of the flexible cord in the nose piece, so as to ensure proper lens alignment and supporting of the frame at the proper height on the nose.

6. The improvement as set forth in claim 4, wherein said anchoring means further comprise a third plurality of closely spaced bores formed adjacent to said first plurality of closely spaced bores, and on the outer end of the respective side of the juncture region of the nose piece, and a fourth plurality of closely spaced bores formed adjacent to said second plurality of closely spaced bores, and on the outer end of the respective side of the juncture region of the nose piece, said third and fourth pluralities of closely spaced bores being adaptable to effectively and selectively anchor the opposing ends of the flexible cord in the nose piece so as to ensure proper lens alignment and supporting the frame at the proper height on the nose.

7. The improvement as set forth in claim 5, wherein the bores, of said third and fourth pluralities of closely spaced bores, are open ended, having a slit-type opening at the side thereof adjacent to the respective peripheral edge of the nose piece, so as to effect easy and fast anchoring of said opposing ends of the flexible cord, in the nose piece.

8. The improvement as set forth in claim 4, wherein said opposing ends of the flexible cord are attached to respective bores of said first and second pluralities of closely spaced bores in predetermined threading or lacing patterns so as to facilitate self-adjustment and maintenance of the proper tension in the flexible cord, necessary for proper lens alignment.

9. In an articulated spectacle frame provided with a nose piece which rests on the nose of the user, the nose piece being formed to generally fit the nose configuration of the user, including a cross bar member that rides on the bridge of the nose, and a pair of spaced apart legs connected by the bar, and extending downwardly, so as to straddle the nose bridge and rest respectively on both opposing sides of the nose, the improvement comprising self-adjusting resilient means suspended in a chordal horizontal fashion across the void area of the nose piece at the juncture region thereof, said void area consisting of the inner non-visible portion of the nose piece, said resilient means being attached to the nose piece, respectively, at both opposing sides of the juncture region, and adapted to bend in a semi-circular curve snugly fitting the nose, under the downward thrust of the spectacle frame, so as to redistribute the weight of the spectacle frame over a substantial portion of the nose, the improvement further comprising said resilient means comprise a pair of flexible cords, suspended in a chordal horizontal fashion, parallel to each other, at the juncture region of the nose piece, so as to effectively redistribute the weight of the spectacle frame over a substantial portion of the nose.

* * * * *